3,523,884
METHOD AND APPARATUS FOR MAKING WALL STRUCTURE IMPERVIOUS TO MOISTURE
Samuel M. Bagno, Belleville, N.J.; Goldie Bagno, administratix of said Samuel Bagno, deceased, assignor to Systron-Donner Corporation, Concord, Calif., a corporation of California
Original application Mar. 23, 1964, Ser. No. 353,990. Divided and this application May 10, 1968, Ser. No. 736,903
Int. Cl. B01k 1/00, 5/00
U.S. Cl. 204—196                                5 Claims

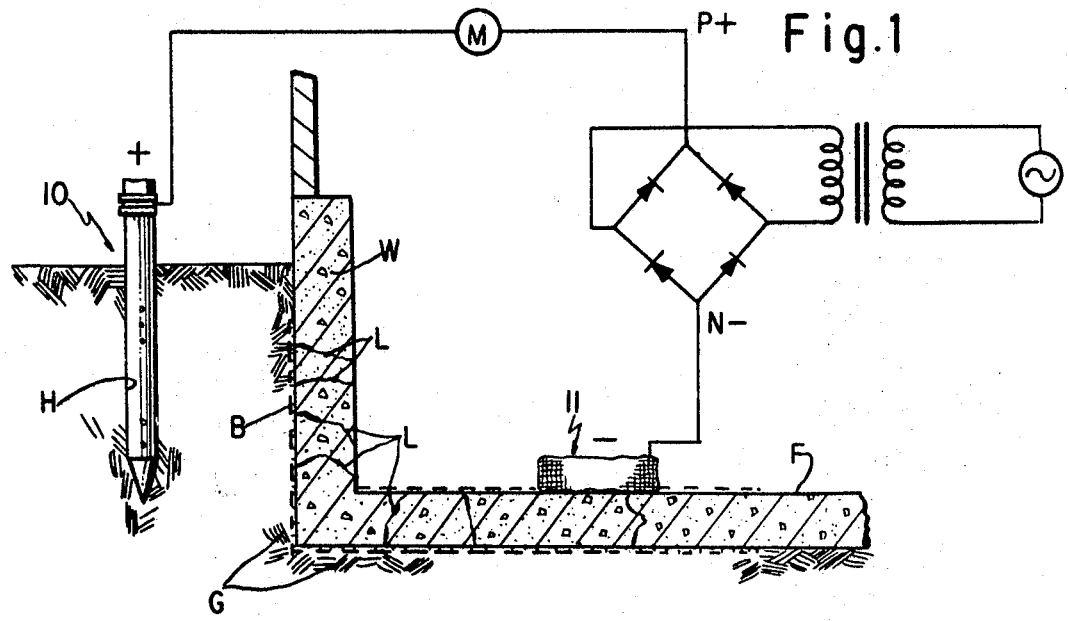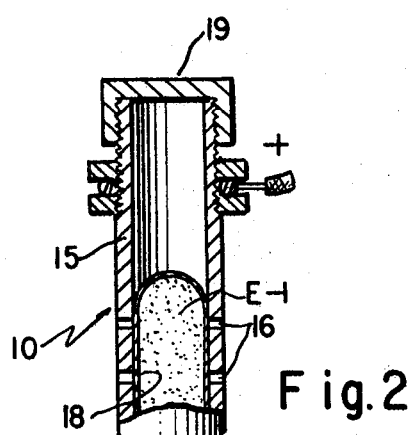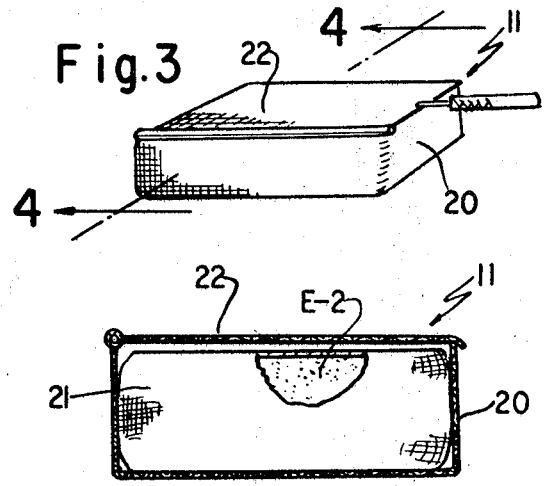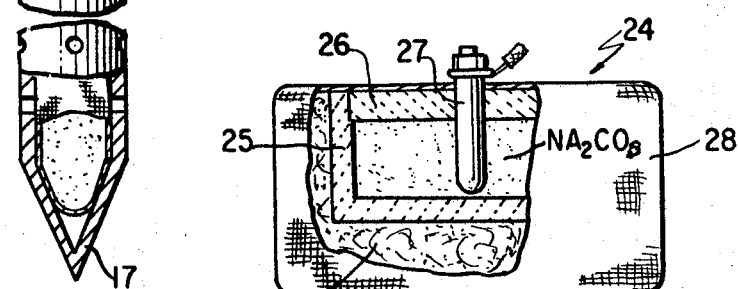
Aug. 11, 1970     S. M. BAGNO     3,523,884
METHOD AND APPARATUS FOR MAKING WALL STRUCTURE
IMPERVIOUS TO MOISTURE
Original Filed March 23, 1964
INVENTOR.
SAMUEL M. BAGNO
BY
ATTORNEY

United States Patent Office 3,523,884
Patented Aug. 11, 1970

ABSTRACT OF THE DISCLOSURE

Apparatus for waterproofing a wall structure including a first electrode adapted for insertion in the ground adjacent to the exterior of the wall and a second electrode adapted for electrical connection to the interior of the wall. A water soluble electrolyte stored in each of the electrodes, and these electrolytes are such that when combined they produce a water insoluble precipitate. Wetting the electrodes and connecting them to the opposite terminals of a direct current power source causes the water insoluble precipitate to collect on the wall structure intermediate the electrodes.

---

This application is a division of parent application Ser. No. 353,990 filed Mar. 23, 1964, now Pat. No. 3,398,071. The method is claimed in the parent application, and the apparatus is claimed herein.

The present invention relates to buildings and structures, and more particularly to a method and apparatus for making wall structure beneath the ground impervious to moisture.

Buildings such as dwellings which are equipped with a heating plant usually are constructed by making an excavation in the ground and lining the excavation with a foundation wall which provides a cellar at least partially below the level of the ground. Such foundation walls are inherently porous at certain points by reason of the construction materials utilized or are porous in the sense that they contain or develop cracks and crevices, whereby after a heavy or prolonged rainfall the ground surrounding the foundation wall becomes exceedingly wet and water seeps through the wall to flood the cellar.

The flooding of cellars is very undesirable, even if the water can be drained to the sewer immediately, because it leaves the cellar moist and wet, and considerable time and effort are required to properly dry out the cellar so as to prevent mold, mildew, worm and insect propagation, and other unwanted effects.

Accordingly, an object of the present invention is to provide a method and apparatus for making walls beneath the ground impervious to moisture.

Another object is to provide such a method which is simple, practical and highly effective.

A further object is to provide such apparatus which is simple and economical in construction.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by placing beneath the ground adjacent the exterior or one side of the wall or like structure a first water soluble electrolyte containing a metallic radical or ion; placing adjacent the interior or the other side of the wall or like structure a second water soluble electrolyte of the kind containing a radical or ion which combines with the metallic radical or ion of the first mentioned electrolyte to produce a substantially water insoluble precipitate, wetting the first and second electrolytes and the wall or like structure at both sides thereof within the area where a leak has been detected, electrically connecting the electrolytes by means of electrodes to the positive and negative terminals of a D.C. power source in a sense whereby an ion of each electrolyte will migrate towards the other to produce a substantially water insoluble precipitate which renders the wall or like structure impervious to moisture at the leaky area.

In the drawing:
FIG. 1 is a schematic view illustrating in cross-section a portion of a cellar wall and floor and the apparatus for carrying out the method in accordance with the present invention.

FIG. 2 is a longitudinal sectional view of an electrode for storing an electrolyte and adapted to be inserted into ground as shown in FIG. 1.

FIG. 3 is a perspective view of an electrode for storing an electrolyte and adapted to be placed on the cellar floor as shown in FIG. 1.

FIG. 4 is an enlarged fragmentary sectional view taken along the line 4—4 on FIG. 3.

FIG. 5 is a sectional view of another electrode.

Referring now to FIG. 1 of the drawing in detail, there is shown a portion of the cellar of a building having a side wall W extending partially beneath the ground G and having a floor F, and apparatus for sealing a leak in the wall W which comprises an electrode 10 for electrically contacting a first water soluble electrolyte E-1 to the positive terminal P of a D.C. power source such as a rectifier connected to an 80 volt A.C. source, from the secondary of a transformer, and an electrode 11 for electrically connecting a second water soluble electrolyte E-2 to the negative terminal N of the D.C. power source.

In one embodiment of the present invention, the first water soluble electrolyte is a compound composed of a metallic radical or electro-positive ion selected from the group consisting of alkaline earth metals, light metals and heavy metals; and the radical or electro-negative ion of an active inorganic acid.

Such metals include, but are not limited to, aluminum, barium, cadmium, calcium, cobalt, copper, iron, lead, magnesium, manganese, nickel, strontium, tin, and zinc.

The active inorganic acids include but are not limited to, acetic, chloric, nitric and sulfuric acid. These acids form salts of the metals just mentioned which are readily soluble in cold water.

Such water soluble salts include aluminum acetate, chloride, nitrate and sulphate; barium acetate, chloride and nitrate; cadmium acetate, chloride and sulphate; calcium acetate, chloride and nitrate; cobalt acetate, chloride, nitrate and sulphate; copper acetate (ic), chloride, nitrate and sulphate; iron acetate (ous), chloride, nitrate and sulphate (ous); lead acetate and nitrate; magnesium acetate, chloride, nitrate and sulphate; manganese acetate, chloride, nitrate and sulphate; nickel acetate, chloride, nitrate and sulphate; tin chloride (ous)

and sulphate; strontium acetate, chloride and nitrate; and zinc acetate, chloride, nitrate and sulphate.

In theory, all these salts and others can be utilized; however, from a practical viewpoint the salts which are the least costly, readily available, non-corrosive, non-toxic or free from other undesirable effects are preferred. toxic or free from other undesirable effects are preferred. soluble electrolyte is a compound composed of an electropositive alkali metal radical or ion such as sodium and potassium, and the radical or electro-negative ion of an inactive acid, including, but not limited to, phosphoric (ortho), and silicic acid which acids combine with the aforementioned metal radicals to form substantially water insoluble salts.

In addition to the compounds just mentioned, water soluble soaps such as the alkali metal soaps of monobasic fatty acids having between 15 and 20 carbons may be utilized to combine the acidic radical thereof with an alkaline earth metal, light metal or heavy metal radical to produce substantially water insoluble soaps. Preferably, such water soluble soaps are used in conjunction with an alkali metal salt of an active acid to ionize the soap.

Also, it has been discovered that chemicals and/or these soaps, by the proper concentrations of ions inside and outside, can cause the acidic radicals or negative ions of the second electrolyte which produces water insoluble compounds to migrate more rapidly toward the first electrolyte than the metallic radicals or positive ions migrating from the first or positive ions to the second electrolyte, whereby the water insoluble compounds are formed closer to the exterior of the wall than the interior of the wall so that water or moisture cannot enter or deeply penetrate the wall. Thus, once the wall has been treated to seal the same, the interior of the wall can dry and remains dry to overcome the undesirable effects of moisture in the cellar.

In practicing the method in accordance with this embodiment of the present invention, a hole H is formed in the ground close to the exterior of the wall W where a leak has been detected, an amount of the first electrolyte E–1 is placed in the hole H, the electrode 10 is placed into the hole H in electrical contact with the electrolyte E–1, an amount of the second electrolyte E–2 is placed on the cellar floor F near the interior of the wall W and opposite the hole H, the electrode 11 is placed over and in electrical contact with the electrolyte E–2, the electrolytes are wetted with the seepage water, and the electrodes are electrically connected to the terminals of the D.C. source as previously described with reference to FIG. 1, whereby migration of radicals or ions producing the substantially water insoluble compound commences and the barrier B of such a compound is produced to seal the area where a leak has been detected and is to be sealed, or where the seepage water wets the inside electrode and initiates the electrochemical action. As the metal of which the electrode 10 is formed, for example iron, is attacked and dissolved by an acidic environment of active acid radicals or ions established thereat, the radicals of such metals or ions migrate with the metallic radicals or ions of the electrolyte E–1 and also combine with the acidic or basic radicals or ions of the electrolyte E–2 to produce an additional substantially water insoluble compound which supplements the barrier B to increase its effectiveness.

It has been found that direct current of between about six and about 250 volts and between about five and about 500 milliamperes (measured by a meter M) will produce the water impervious barrier on the surfaces and/or in the wall W in between about one and about three weeks. The duration of time of the treatment will be shorter with the higher voltage impressed and higher current flow between the electrodes 10 and 11.

While the electrodes 10 and 11 may be rods, tubes or plates, the electrodes preferably are constructed to store the dry electrolytes as shown in FIGS. 2 to 4.

Referring now to FIG. 2, an electrode 10 is shown which comprises a tube 15 having perforations 16 and having a pointed lower end 17 to facilitate driving the tube into the ground like a stake, a measured quantity of dry electrolyte E–1 in the tube, a liner 18 of suitable paper or fabric, for example fiber glass cloth, at the inner wall of the tube to retain the electrolyte within the tube while dry and to control the rate of flow thereof when wet and being dissolved into the ground, and a removable cap 19 for closing the upper end of the tube.

Referring now to FIGS. 3 and 4, an electrode 11 is shown which comprises a shallow, rectangular box-like structure of metallic wire mesh 20. A measured quantity of dry electrolyte E–2 is provided in a liner or bag 21 which is disposed within the box 20. This liner is similar in construction and function to the liner 18 in the electrode 10. A removable metal cover 22 is provided for the top of the box.

By constructing the electrodes 10 and 11 in the foregoing manner, the exact amount of electrolyte can be packed and stored therein which is required to provide one treatment at a prescribed current and voltage for a predetermined duration of time. This enables the method in accordance with the present invention to be practiced by people of ordinary skill, whereby the cost of labor is greatly reduced. After the electrodes have been used, they can be refilled for further use so long as they still are in usable condition.

Preliminary experiments were performed by placing a flower pot having a small hole in the bottom thereof in a pail, surrounding the side and bottom of the pot with soil in the pail containing an amount of the electrolyte E–1, placing an amount of the electrolyte E–2 in the pot, wetting the soil with an excess of water of about one inch on the top thereof, pouring water into the pot to provide a puddle about one inch deep, inserting an electrode 10 into the soil, placing an electrode 11 in the puddle, electrically connecting the electrode 10 at the positive terminal of a 40 volt D.C. source, and electrically connecting the electrode 11 to the negative terminal of the D.C. source.

After about one week the hole in the pot was sealed with a substantially water insoluble mass or wall which retained water in the pot without any sign of leakage through the mass. These experiments were performed with a number of the aforementioned E–1 and E–2 electrolyte combinations and all of these sealed the hole in the pot effectively.

As a specific example of practicing the present invention, the apparatus comprised an electrode 10 formed of an iron pipe three feet long having an inner diameter of two inches and having twenty perforations one eighth inch in diameter, and filled with three pounds of calcium chloride; and an electrode 11 in the form of a six-inch by six-inch by twenty-four-inch box having sixteen mesh wire sides and a similar cover, and filled with two pounds of sodium ortho-phosphate and one-half pound of sodium stearate, the entire apparatus enclosed in a fiber glass bag; a rectified power supply having an 80 volt D.C. output with its positive terminal P connected to the electrode 10 and its negative terminal N connected to the electrode 11; and an ammeter M connected in series between negative terminal N and the electrode 11.

The cellar wall W was constructed of concrete about eight inches thick and had leaked badly during and after a one-half inch rainfall on the outside ground about four feet above the cellar floor F to cause the floor to be flooded with water. The cellar floor F was constructed of concrete covered with plastic tile. This floor also leaked. It had a slight slope toward the wall W. It did not drain off and had to be bailed to remove the water from the cellar floor.

The apparatus was arranged by driving the electrode 10 (FIG. 2) into the wet ground G about three feet below the ground, the cap 19 was removed, about four quarts of water were poured into the tube and on the ground adjacent thereto; and the electrode 11 (FIGS. 3 and 4) was placed on the cellar floor in a puddle of water about one inch deep.

The rectifier was then energized by the A.C. supply whereupon the ammeter indicated that 300 milliamperes of current were being drawn. This caused the aforementioned radicals or ions to migrate by electrolyte action to produce the barrier B.

The process was continued for three weeks, while maintaining the electrolytes moist by the addition of water to the electrolytes of the electrodes 10 and 11. At the end of this period, the puddle had dried and/or was electrolytically decomposed.

The apparatus was then disconnected and dismantled, and it was found that practically all of the electrolytes had been dissolved and/or decomposed.

This experimental treatment was performed in private on the applicant's premises about two years ago, and the treated area of the wall never leaked again even during and after exceedingly heavy or prolonged rainfalls, wherefore it is apparent that a protective barrier which is impervious to moisture has been formed at the exterior of the wall or within the wall capable of preventing water from leaking into the cellar.

It is believed that the protective barrier with the material used was composed of calcium and iron phosphate having a solubility of less than 0.002 gram in 100 cc. of cold water; and calcium stearate having a solubility of about 0.004 gram in 100 cc. of cold water. The term cold water is used herein in the sense that the temperature of the water does not exceed about 20° C.

During this test it was found that a large portion of the sodium stearate seemed to precipitate at the negative electrode by the hydrogen developed there by the electrolysis. This tended to clog the electrode reducing its effective area and wasting a large portion of the stearate ions. In order to overcome these disadvantages, a sodium carbonate negative electrode 24 such as shown in FIG. 5 was devised.

This electrode comprises a porous unglazed porcelain cup 25 containing dry sodium carbonate, a cover 26 for the cup, and an iron rod 27 mounted on the cover 26 and immersed in the sodium carbonate. The porous porcelain cup in turn is immersed halfway into the sodium stearate and sodium phosphate powder, and the whole electrode system is enclosed in a fiber glass bag 28.

Rain water seepage would wet the electrode system and cause the flow of current. The sodium carbonate within the porous cup was dissociated by the current. The sodium ion deposited at the negative electrode decomposed to a water molecule forming sodium hydroxide and evolving hydrogen. The carbonate ion drifted through the wetted porous wall of the porcelain cup 25 where it gave up some of its charge to the stearate and phosphate ions causing them to move toward the positive electrode 10. Its sodium ions drifted through the cup in the other direction to the negative electrode rod 27 whereby the hydrogen evolved did not precipitate any of the stearate ions.

In another embodiment of the present invention, the electrolyte E–1 at the outside of the wall is a basic compound containing a negative hydroxyl radical (OH), and an alkali metal or alkaline earth metal positive ion or an ammonia radical including but not limited to barium, calcium, lithium, potassium, sodium, strontium, ammonium ($NH_4$) and In theory, all of these hydroxides can be utilized; however, from a practical viewpoint hydroxides which are beneficial to the soil are preferred, for example, calcium hydroxide (slaked lime) and hydroxides of nitrogen containing radicals.

In this embodiment of the present invention, the electrolyte E–2 at the inside of the wall is a water soluble salt containing a metallic ion which reacts with a hydroxyl radical to form water insoluble hydroxides. Such metallic ions include but are not limited to aluminum, cadmium, copper, iron, lead, magnesium, manganese, nickel and zinc. Soluble salts of such metals are already set forth in the description of the first embodiment of the present invention.

In the system just described the outside electrode 10 is connected to the negative terminal of the power source and the inside electrode 11 is connected to the positive terminal of the power source. For example, the soil at the outside in the vicinity of the electrode 10 is made basic with ammonia water and a water soluble iron salt is dissolved in the water at the inside of the wall. The electric current will draw the negative hydroxyl ion from the outside of the wall into the wall and will draw the positive iron ion from the inside of the wall into the wall, whereby these ions will meet at the points where water seeps through the wall and will combine to form a precipitate of iron hydroxide at and/or within the wall to seal the leak.

In both embodiments of the present invention, the ions in the water carry the electric current, whereby the current must follow the path of the water seepage. Generally, this is a constricted path of leaks L that follows the imperfections in the wall structure through which the water seeps. Because of this constricted path a small quantity of precipitate, usually less than one pound, provides a satisfactory seal for a leaky zone of considerable area.

While in most instances compounds which dissolve readily in water are preferred, slightly water soluble compounds, such as lime, capable of being wetted by water to become ionized and serve as electrolytes also can be utilized and thus are deemed to come within the scope of the present invention. Thus the term water soluble compounds as used herein includes all compounds which function as an electrolyte and in the presence of an electrical current from a D.C. source produce migrating ions. The selection of any particular compounds therefore is not critical, except for practical considerations.

From the foregoing description, it will be seen that the present invention provides a method and apparatus for sealing leaky underground walls or the like in a simple, practical, reliable and economical manner without the requirement of skilled technicians or high labor costs.

I claim:

1. In apparatus for making the subterranean portion of a wall structure impervious to moisture, a first pervious electrode adapted for insertion in the ground proximate to the exterior of said wall structure, a first water soluble electrolyte stored in said first electrode, a second pervious electrode adapted for electrically contacting the interior of said wall structure, a second water soluble electrolyte stored in said second electrode, said first and second electrolytes being adapted for forming a substantially water insoluble precipitate when combined, and means electrically connected to said first and second electrodes for connecting said electrodes to opposite terminals of a source of direct current.

2. Apparatus as in claim 1 wherein said second electrolyte includes a water soluble soap of the kind which forms water insoluble and water repelling metallic soaps.

3. Apparatus as in claim 2 wherein said second electrolyte further includes an alkali metal salt of an active acid of the kind which ionizes the water soluble soap.

4. Apparatus as in claim 1 wherein said first electrode comprises an elongate tubular member fabricated of an electrically conductive material, said member being formed to include a chamber for holding the electrolyte, a plurality of openings in communication with said chamber, a conically tapered lower portion, and a water pervious liner disposed in said chamber and adapted for holding a dry soluble electrolyte.

5. Apparatus as in claim 1 wherein said second electrode comprises a container having perforated planar side and bottom walls fabricated of an electrically conductive material, a water pervious liner disposed in said container, a porous cup disposed in said liner, a dry mixture of a water soluble soap and a water soluble salt disposed in said liner outside said cup, and a dry alkaline salt disposed within said cup.

References Cited

UNITED STATES PATENTS

| | | | |
|---|---|---|---|
| 969,921 | 9/1910 | Thum | 204—283 |
| 2,104,812 | 1/1938 | Phillips | 204—283 |
| 2,157,180 | 5/1939 | Little | 204—197 |
| 2,273,036 | 2/1942 | Heise et al. | 204—284 |
| 2,371,123 | 3/1945 | Amundsen | 204—283 |
| 2,870,072 | 1/1959 | Merlub-Sobel | 204—285 |
| 3,019,384 | 1/1962 | Wayne | 204—195 |
| 3,340,170 | 9/1967 | Marulli et al. | 204—213 |

FOREIGN PATENTS 420,402  11/1934  Great Britain.

TA-HSUNG TUNG, Primary Examiner

U.S. Cl. X.R.

204—130, 180, 283, 284, 299